No. 859,506. PATENTED JULY 9, 1907.
J. G. MORTON.
MACHINE FOR MOLDING PLASTIC MATERIALS.
APPLICATION FILED MAY 7, 1906.

2 SHEETS—SHEET 1.

WITNESSES=
E. B. Tomlinson.
Patrick J. Conroy

INVENTOR=
John G. Morton
by Browne & Woodworth
Attorneys.

No. 859,506. PATENTED JULY 9, 1907.
J. G. MORTON.
MACHINE FOR MOLDING PLASTIC MATERIALS.
APPLICATION FILED MAY 7, 1906.

2 SHEETS—SHEET 2.

WITNESSES:
E. B. Tomlinson
Patrick J. Conroy

INVENTOR:
John G. Morton
by Browne & Woodworth
Attorneys.

UNITED STATES PATENT OFFICE.

JOHN G. MORTON, OF SOUTH BOSTON, MASSACHUSETTS.

MACHINE FOR MOLDING PLASTIC MATERIALS.

No. 859,506.

Specification of Letters Patent.

Patented July 9, 1907.

Application filed May 7, 1906. Serial No. 315,489.

*To all whom it may concern:*

Be it known that I, JOHN G. MORTON, a citizen of the United States, and a resident of South Boston, in the county of Suffolk and State of Massachusetts, have invented a new and useful Improvement in Machines for Molding Plastic Materials, of which the following is a specification.

My invention relates to machines for molding plastic materials and the object of my invention is to provide a machine whereby bodies of unusual shape, such as cannot readily be molded by the more usual types of molds, may be accurately and rapidly formed.

With this object in view my invention comprises essentially a mold casing provided with one or more independently movable or rotatable forming members, which may be radially arranged about a common center, and means for compressing the material to be molded and for forcing the same through said mold casing.

My invention may best be understood by having reference to the drawings which accompany and form a part of this specification and which illustrate one of the many possible embodiments thereof; but it is to be understood that I do not limit my invention to the particular embodiment thereof which is herein illustrated for the purpose of more fully disclosing my invention, inasmuch as many modifications may be made therein by those skilled in the art without departing from the spirit of my invention.

Figure 1:
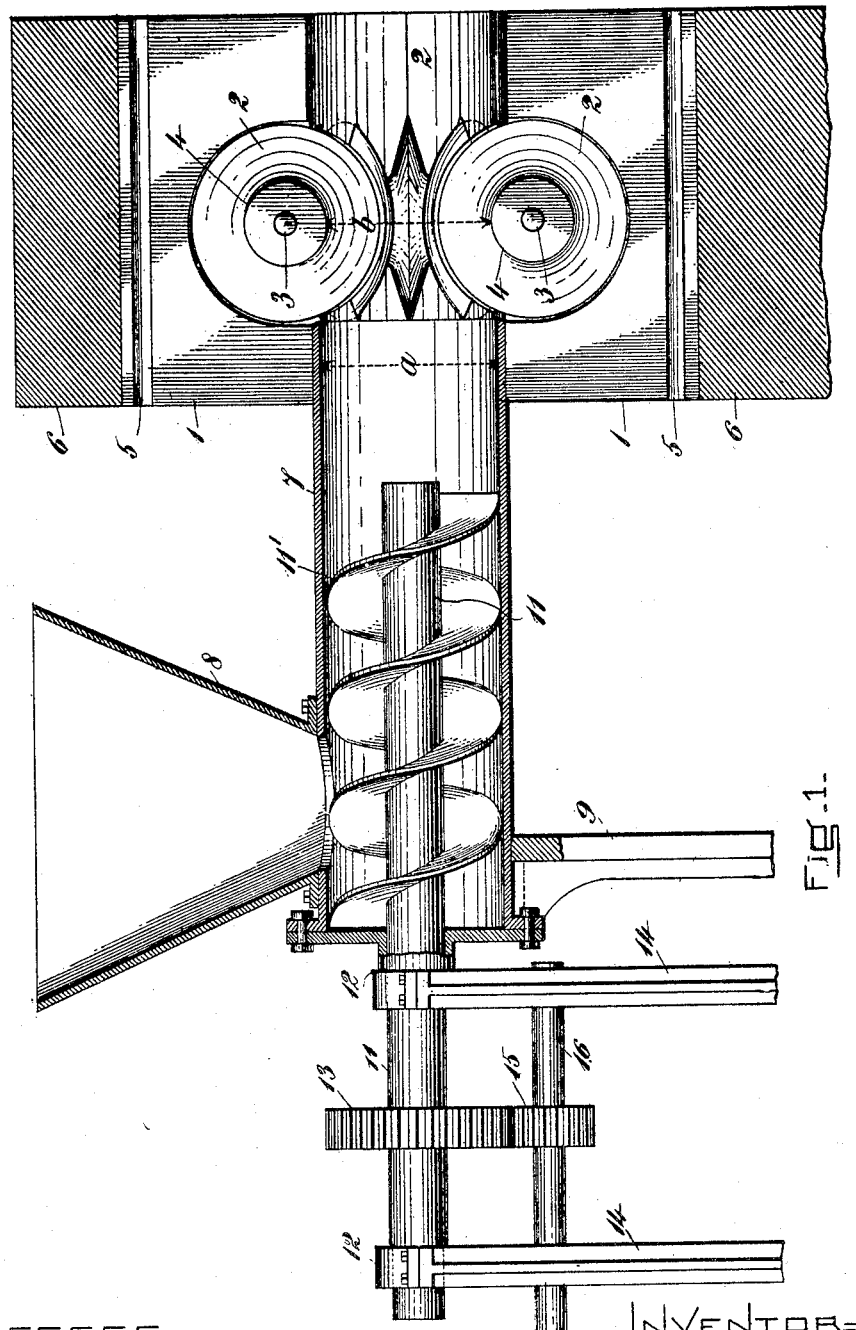
Figure 2:
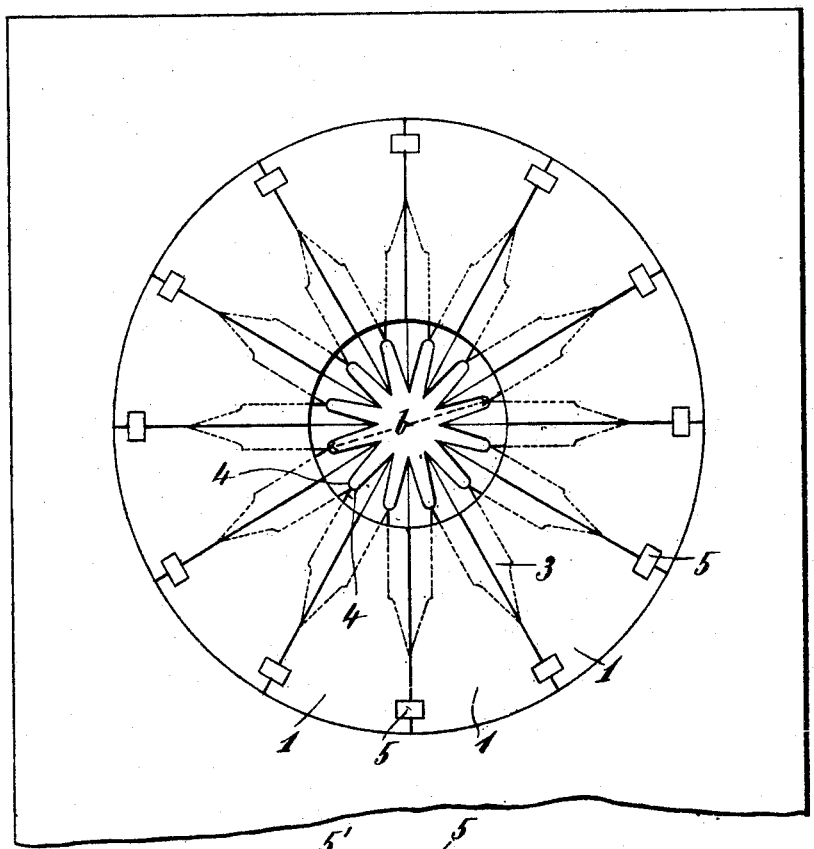
Figure 3:
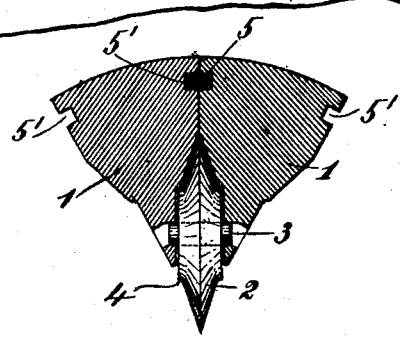

In the drawings, Figure 1 represents a longitudinal section of a molding machine constructed according to the principles of my invention. Fig. 2 is an end view of said machine. Fig. 3 is a view partly in section illustrating a pair of adjacent segmental members and a forming member journaled between the same.

The mold casing, as shown in the present case, is made up of a plurality of segmental members 1, between each adjacent pair of which a forming member 2 is journaled by the pins 3. Each segmental member 1 is milled out so that the forming member 2 may snugly fit the space between said members 1. The segmental members may be inserted in any suitable frame 6 and may be provided with slots 5' receiving the cotters 5. The members 1 and 2 are so designed and arranged that each pair of adjacent forming members come closely in contact at the points 4, so as to insure the continuity of the contour of the mold, as shown most clearly in Fig. 2.

Any suitable means may be employed for compressing the material to be molded into cylindrical or other form, and for forcing the same through the mold casing and as shown in Fig. 1, I may employ for this purpose a spiral conveyer consisting of a shaft 11 journaled in the bearings 12, 12 and provided with the spiral blade 11'. By means of the shaft 16 which may be driven by any suitable means, and the gears 15 and 13, the shaft 11 and its spiral blade 11' may be rotated in such a direction as to convey the material placed in the hopper 8 through the tube 7 and compress said material into cylindrical form, and finally force the same through the mold casing. Preferably the inside diameter $a$ of the tube 7 should be greater than the diameter $b$ of the mold, so that the material in passing through the mold may be still further compressed and the radially extending flanges, which are formed by two adjacent forming members, may be solidly formed. In order to insure the greater strength of the molded body, I prefer to so taper the forming members that the radially extending flanges will be wider at their bases than at their outer ends. Further it is desirable to so construct and arrange the forming members that the aforesaid result is effected, in order to provide suitable clearance and to diminish thereby the friction between the material to be molded and the forming members.

Although I have shown in the drawings a mold casing comprising twelve independently rotatable and radially arranged forming members, it is to be understood that I do not desire to limit myself to any particular number or shape or arrangement of such forming members. The particular form shown in the drawings is designed especially for molding carbons for primary batteries and the object in molding carbons of the shape shown is to increase as greatly as possible the effective area thereof. Heretofore it has been attempted to mold battery carbons by forcing a plastic material, consisting of carbon and a suitable binder, through a mold casing provided with radially extending immovable forming members; but on account of the enormous friction developed between the plastic carbonaceous material and the aforesaid immovable forming members, the process has not been found practicable. It will be apparent that by means of the invention herein described I overcome the aforesaid defect of the carbon molding machines of the prior art. It is not to be understood, however, that the machine herein described is limited in its use to molding battery carbons, but on the contrary, it will be found efficacious in the manufacture of tiles, bricks, or any other bodies molded from plastic materials and especially such bodies of the more unusual shapes.

It will be understood that the entire machine is preferably firmly secured to a suitable base by means of the supports 9 and 14 and by means of an extension from the box or frame 6.

I claim:

1. In a molding machine, a mold casing comprising a plurality of rotatable and radially arranged forming members constructed and arranged to form radially extending flanges on a body of plastic material, in combination with means for compressing the material to be molded and forcing the same through said mold casing.

2. In a molding machine, a mold casing comprising a plurality of rotatable and radially arranged forming members constructed and arranged to form radially extending flanges on a cylindrical body of plastic material, means for forming a cylindrical body of compressed plastic material and means for forcing said cylindrical body through said mold casing.

3. In a molding machine, means for forming a cylindrical body of compressed plastic material, in combination with means for forming on said body radially extending flanges wider at their bases than at their outer ends.

4. In a molding machine, means for forming a cylindrical body of compressed plastic material, in combination with a plurality of independently rotatable and radially arranged forming members constructed and arranged to form on said body radially extending flanges wider at their bases than at their outer ends.

5. In a molding machine, a tube, means for forming a cylindrical body of plastic material therein, and forcing the same therethrough, a mold casing adapted to receive the end of said tube, and a plurality of independently rotatable and radially arranged forming members journaled in said casing, said forming members being constructed and arranged to form radially extending flanges on said cylindrical body.

6. In a molding machine, a tube, means for forming and compressing a cylindrical body of plastical material therein and feeding the same therethrough, a mold casing adapted to receive the end of said tube, and a plurality of independently rotatable and radially arranged forming members journaled in said casing, said forming members being constructed and arranged to further compress said body of plastic material and to form radially extending flanges on the same.

7. In a molding machine, a frame, a plurality of supporting members secured therein, each constructed to receive a portion of a forming member, a plurality of independently rotatable and radially arranged forming members, each journaled between a pair of adjacent supporting members and being constructed and arranged to form a star-shaped mold adapted to convert a cylinder of plastic material into a core having a plurality of radially extending flanges, means for forming a cylinder of plastic material and means for forcing the same through said mold.

In testimony whereof, I have hereunto subscribed my name this 30th day of April. 1906.

JOHN G. MORTON.

Witnesses:
CHAS. W. ADAMS,
GEO. K. WOODWORTH.